United States Patent
LoGalbo et al.

[11] Patent Number: 6,128,763
[45] Date of Patent: Oct. 3, 2000

[54] DYNAMICALLY CHANGING FORWARD ERROR CORRECTION AND AUTOMATIC REQUEST FOR REPETITION

[75] Inventors: Robert LoGalbo, Hoffman Estates; Charles J. Malek, Barrington, both of Ill.

[73] Assignee: Motorola, Inc., Schaumburg, Ill.

[21] Appl. No.: 09/145,091

[22] Filed: Sep. 1, 1998

[51] Int. Cl.[7] .................... H03M 13/00; H04L 1/18
[52] U.S. Cl. ................................ 714/774; 714/751
[58] Field of Search .................... 714/752, 748, 714/774, 751

[56] References Cited

U.S. PATENT DOCUMENTS

| | | | |
|---|---|---|---|
| 5,444,719 | 8/1995 | Cox et al. | 371/37.1 |
| 5,526,399 | 6/1996 | Kameda | 379/58 |
| 5,600,663 | 2/1997 | Ayanoglu et al. | 371/41 |
| 5,719,883 | 2/1998 | Ayanoglu | 371/35 |

Primary Examiner—Albert De Cady
Assistant Examiner—Samuel Lin
Attorney, Agent, or Firm—Kenneth A. Haas

[57] ABSTRACT

A transceiver device having a forward error correction decoder providing at least one forward error correction metric and a data integrity monitor providing at least one automatic retry query metric to a data processor or CPU. The data processor or CPU is responsive to the forward error correction metric and the automatic retry query metric and has outputs providing a forward error correction value and an automatic retry query value to the forward error correction/data encoder and decoder.

5 Claims, 7 Drawing Sheets

| INPUT SEQUENCE I | SHIFT REGISTERS | | | OUTPUT SEQUENCE $O_1$ $O_2$ | |
|---|---|---|---|---|---|
| | $S_1$ | $S_2$ | $S_3$ | | |
| 1 | 1 | 0 | 0 | 1 | 1 |
| 1 | 1 | 1 | 0 | 1 | 0 |
| 0 | 0 | 1 | 1 | 1 | 1 |
| 1 | 1 | 0 | 1 | 0 | 0 |
| 0 | 0 | 1 | 0 | 0 | 1 |
| 1 | 1 | 0 | 1 | 0 | 1 |
| ⋮ | ⋮ | ⋮ | ⋮ | ⋮ | ⋮ |

# 6,128,763

DYNAMICALLY CHANGING FORWARD ERROR CORRECTION AND AUTOMATIC REQUEST FOR REPETITION

FIELD OF THE INVENTION

This invention relates generally to error correction in a data network and specifically to dynamically adjusting the data network's forward error correction and automatic retry query parameters for an increase in network transmission efficiency.

BACKGROUND OF THE INVENTION

The methods of forward error correction (FEC) and automatic retry query (ARQ) error control schemes are known by people skilled in the art of data networking. ARQ schemes require additional check bits to be appended to each transmitted message, block, or frame to enable a receiving device to detect when data errors have occurred. Once an error is detected another copy of the transmitted message, block or frame is re-sent.

A simplistic method of ARQ is implemented using a Cyclic Redundancy Checker (CRC). A numeric value is computed from the bits in the message, block, or frame to be transmitted and is appended to the tail of the message. The receiving device receives the data and can detect if one or more errors have occurred in the received message by applying a polynomial function to the received message, block, or frame. If the result of the polynomial function does not equal zero, then an error has occurred and the message must be retransmitted. The quality of the communication path inversely relates to the number of data errors and required retransmission that occur in a network. Data transmitted over a low quality communication path will be more efficient with smaller retransmission blocks of data because more retransmissions are required. Transmission over a clean communication path will be more efficient with larger retransmission blocks of data, which are sent less often.

An additional method of detecting an error in a received message, block or frame is by calculating a checksum and appending the checksum to the end of the message, block or frame. The receiving device receives the message and re-calculates a checksum and compares the received checksum with the calculated checksum. If the checksum's do not match, an error has been detected and the message, block or frame must be partially or fully retransmitted. Traditionally communication systems have used fixed retransmission message, blocks, or frame sizes when the CRC or checksum ARQ methods are used.

With FEC, however, additional digits are added to each transmitted message by an encoder to enable the receiving device not only to detect errors but also to locate the position of the errors in the received message. The errors are then corrected by inverting the bits at the locations identified by the error locator polynomial in the received message. The greater the number of bits, within a frame to be correctable, the larger the encoder has to be with additional overhead bits being added in each frame. Traditional approaches to FEC establish a fixed bit size for the encoder. If the communication path is of high quality and few errors occur, bandwidth is wasted with the extra encoding of each message, block, or frame.

Therefore, there exists a need for a method and apparatus for dynamically adjusting the forward error correction and automatic request for retransmission parameters based on the quality of the received signal and data integrity.

DETAILED DESCRIPTION OF THE PREFERRED EMBODIMENT

The present invention provides a method and system for dynamically changing the Forward Error Correction (FEC) and Automatic retry query (ARQ) parameters based on a received radio frequency (RF) signal's quality.

Figure 1:
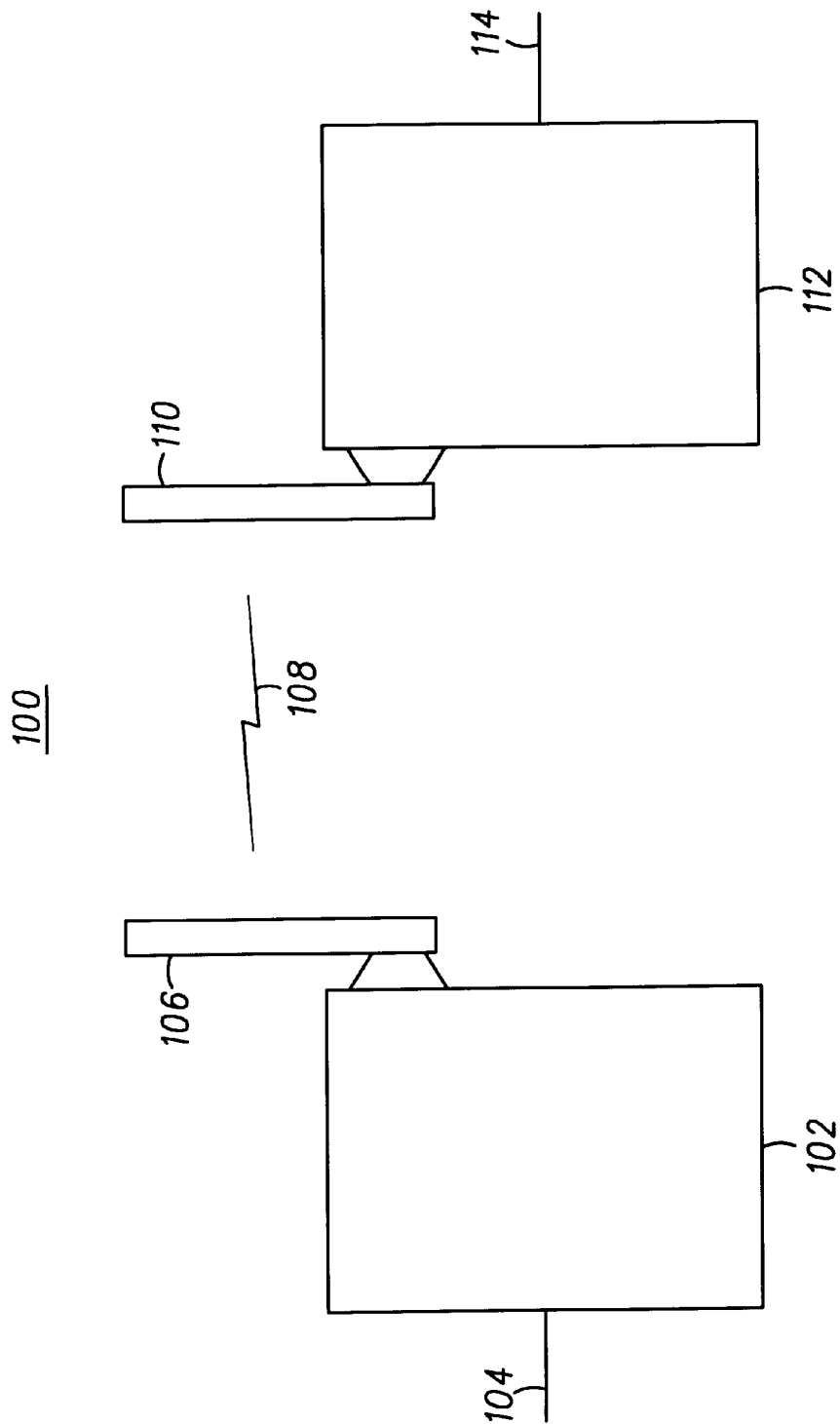
FIG. 1 is a diagram of a transmitting and a receiving device in accordance with a preferred embodiment of the invention.

FIG. 1 is a diagram of a transmitting device 102 and a receiving device 112 in accordance with a preferred embodiment of the invention. The transmitting device 102 has a data port 104 and an antenna 106. Data is received by the transmitting device at the data port 104 and the data is encoded for transmission by a transceiver located in the transmitting device 102. The encoded data is then sent by means of a radio frequency (RF) signal through the antenna 106 as a transmitted RF signal 108. The RF signal can be sent out over the air or any other medium that can carry RF signals, such as fiber optics or coaxial cable. The receiving device (by means of an antenna 110) receives the transmitted RF signal 108. The received transmitted RF signal 108 is then processed by a transceiver in the receiving device 112. The resulting data from the RF signal is sent out a data port 114 located on the receiving device 112.

Figure 2:
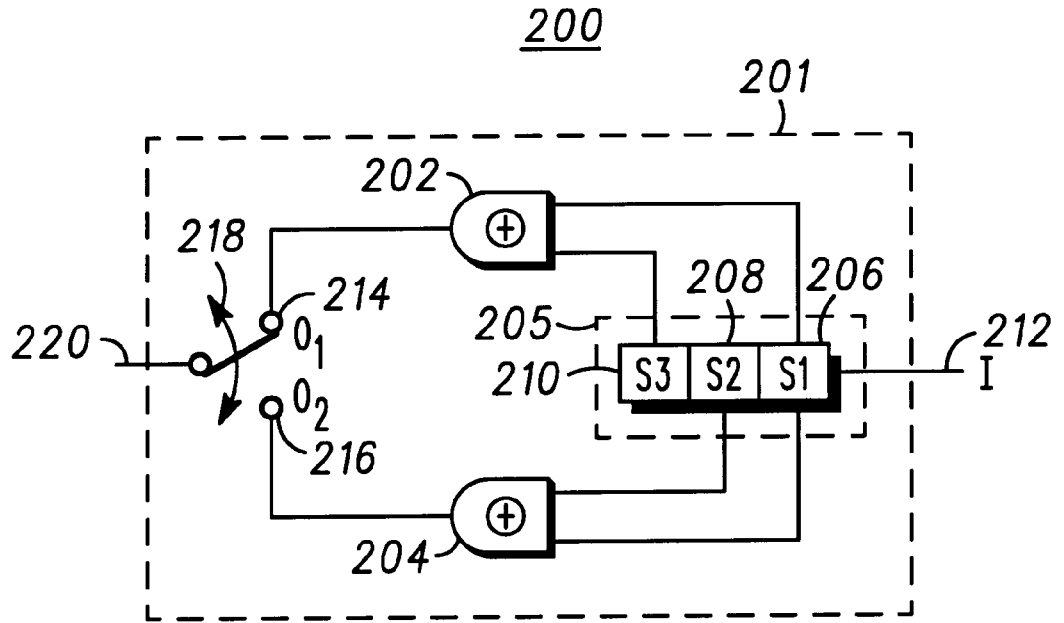
FIG. 2 is a logic diagram and truth table for a Viterbi encoder in accordance with a preferred embodiment of the invention.

FIG. 2 is a logic diagram 200 and truth table 250 for a convolutional encoder in accordance with a preferred embodiment of the invention. A RF signal, transmitted from transmitting device 102 and received at an insufficiently high C/I ratio by a receiving device 112 can have errors occur due to additive white gaussian noise, interference from other RF signals, and thermal noise (KTB, Boltzman's noise). This type of interference is commonly called electronic noise and can be caused from electrical device, sunspots, magnetic fields, and distortion of the signal. In order to correct data errors in a received signal a method of forward error correction can be implemented.

A common method of forward error correction is convolutional encoding. A convolutional encoder 200 can be configured to fix different size errors. FIG. 2 shows a Viterbi encoder 201 capable of encoding data in a way to correct two bit errors. The encoder is not limited to only a 2 bit convolutional encoder, but rather has the ability to change from a 1 bit to 'N' bit encoder dynamically. Data enters the convolutional encoder 201 from a serial input 212. The data from the serial input 212 is stored in a three-bit shift register 205. The first bit is stored in register S1 206. When the second bit arrives it is stored in register S1 206 and the previous bit in S1 206 is shifted to register S2 208. The next bit received is placed in register S1 206 and the previous values in S1 206, and S2 208 are shifted. S2 208 contains the prior value of S1 206 and S3 210 contains the prior value of S2 208.

The R=1/2 convolutional encoder 201 generates two output bits for every input bit that enters the shift registered. The first register S1 206 and third register S3 are connected to a logic XOR gate 202. The output of the S1/S3 XOR gate 214 is ready for transmission to a transceiver. The shift register S1 206 and shift register S2 204 are connected to a second logical XOR gate 204. The output of the S1/S2 XOR gate 204 is then also ready for transmission. The output 220 of the convolutional encoder 201 receives data from each of the XOR gates 202, 204 by means of a switch 218 that oscillates between each of the XOR gate outputs 214, 216. To further clarify the workings of the Viterbi encoder 201 a logic table 250 is also shown in FIG. 2.

Figure 3:
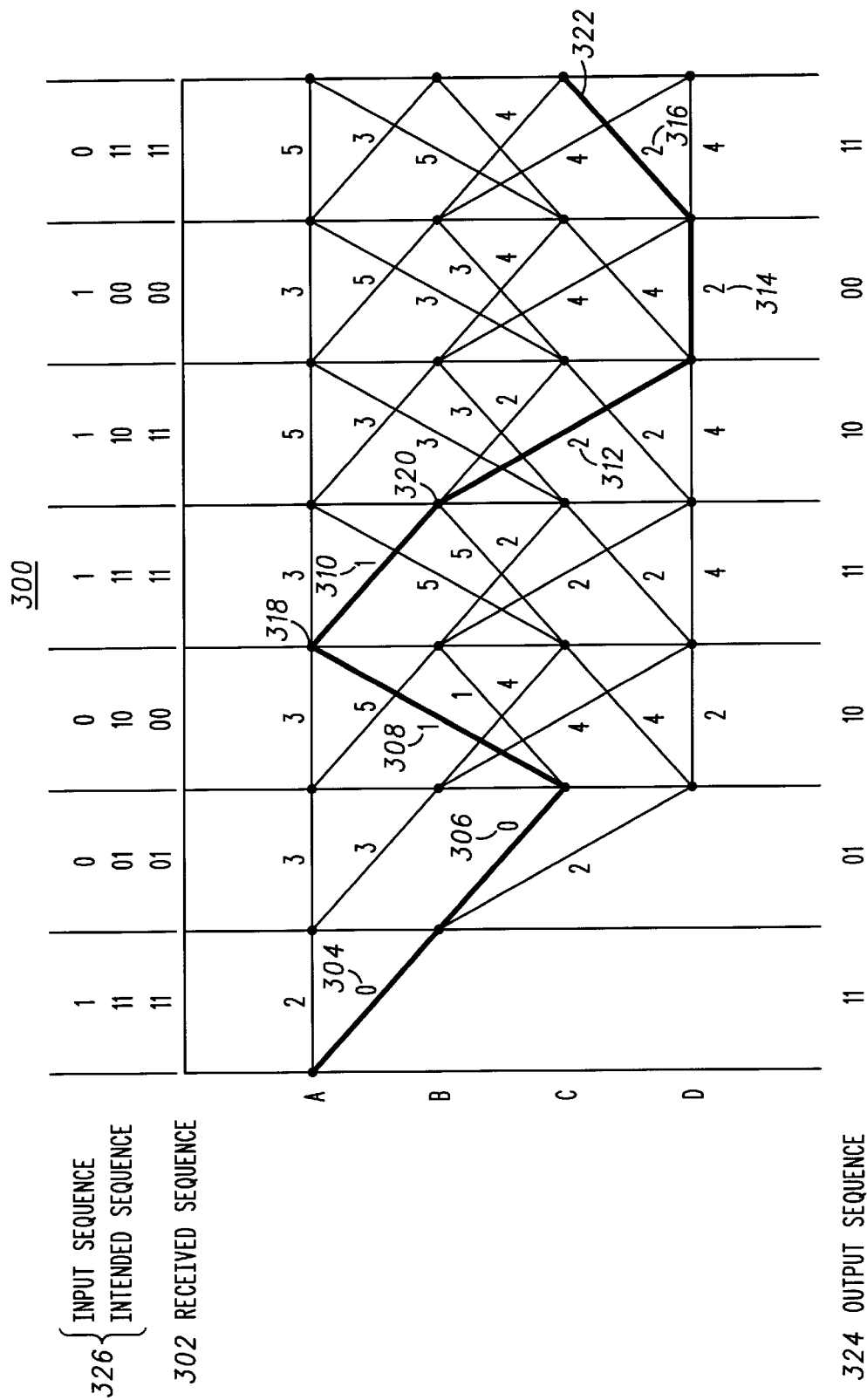
FIG. 3 is a lattice diagram of a Viterbi sequence in accordance with the preferred embodiment of the invention.

FIG. 3 is a lattice diagram 300 of a Viterbi sequence in accordance with the preferred embodiment of the invention. The aim of a Viterbi decoder is to determine the most likely output sequence 324, given a received bit stream and knowledge of the encoder 326. A person skilled in the art knows how to implement a convolutional encoder and Viterbi decoder and this embodiment only makes use of the metrics derived from such a decoder or other similar decoders. The decoding procedure is equivalent to comparing the received sequence 302 with all the possible sequences that may be obtained with the respective encoder and then selecting the sequence that is closest to the received sequence. A running count 304–316 is maintained of the distance between the actual received sequence and each possible sequence but, at each node in the trellis, only a single path is retained. There are always two paths merging at each node 318, 320 and the path survivor selected is the one with the minimum distance, the other being simply terminated. The retained paths are known as survivor paths 322 and the final path selected is then the one with a continuous path through the trellis with a minimum aggregated distance 322.

The Viterbi decoder can generates two metrics. The first is a Viterbi-path metric and the second is the number of erasures or corrections that have occurred. The path metric is a distance count. If the count is zero then no error where detected. Otherwise the greater the count the more errors detected. The second metric is generated to track the number of error corrections that have occurred. An error correction is the process of detecting a one or two bit error in the data and correcting the data.

Figure 4:
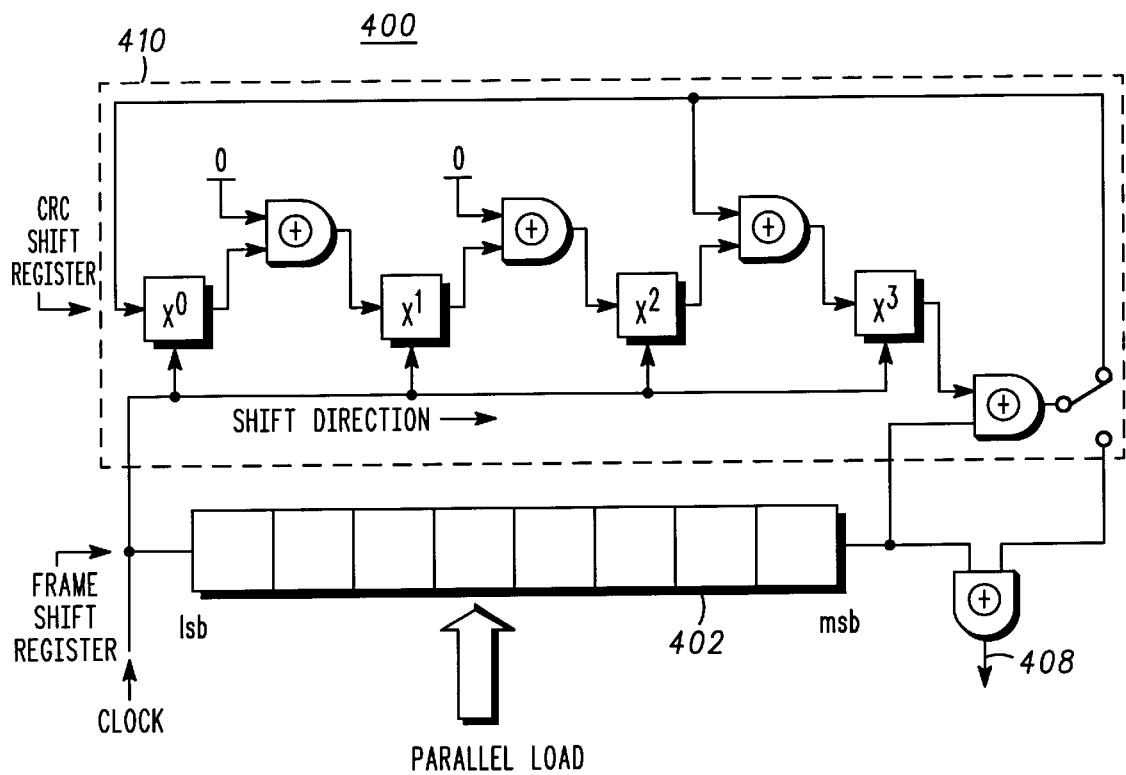
FIG. 4 is a logic diagram for a Cyclic Redundancy Checker in accordance with the preferred embodiment of the invention.

FIG. 4 is a logic diagram 400 for a Cyclic Redundancy Checker (CRC) in accordance with the preferred embodiment of the invention. A polynomial is generated by the CRC encoder 400 having a frame shift register 402 and a CRC shift register 410, such that when the original data 406 is divided by the polynomial 404 there is no remainder. If a remainder is detected then an error has occurred during transmission. The polynomial is appended to the original data 406 and transmitted 408 as one message, block, or frame. The encoding of the polynomial is dependent on the size of the data to be transmitted. In FIG. 4 the polynomial generated is limited to 8-bits, because the register for the data is an 8-bit register 402. In the preferred embodiment, the logical circuit is implemented in software and is dynamically configurable for different data sizes in addition to the 8-bit register 402 shown. The metric that is generated by this error detection scheme is a CRC count. The CRC count is calculated for a fixed period of time or for a fixed number of messages, blocks or frames.

Another method used to check the data integrity of is a checksum value. A checksum is a value that is derived from data that is going to be transmitted and appended onto the message, block, or frame that is transmitted. The receiving device reverses the process and compares the received checksum with the newly calculated checksum. If the results of the calculated and received checksums are equal then no errors have occurred. The metric that is generated by this error detection scheme is a checksum error count. The checksum error count can be calculated for a fixed period of time or it can be an average number of errors for fixed time period. The greater the counter or average the greater the number of errors encountered.

Figure 5:
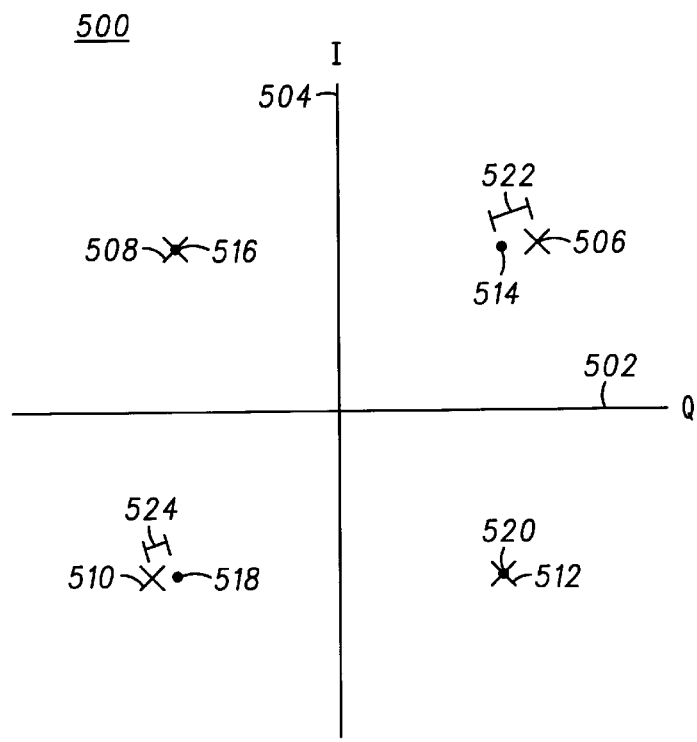
FIG. 5 is a diagram of a Mean Square Error of a Symbol Position error detection in accordance with the preferred embodiment of the invention.

FIG. 5 is a diagram 500 of a Mean Square Error of a symbol position in accordance with the preferred embodiment of the invention. The diagram 500 represents a Quadrature Amplitude Modulated (QAM) signal having a quadrature imaginary axis 502 and an In-Phase real axis 504. The QAM signal represented in the diagram 500 is a 4 QAM signal but any m-array QAM or PSK signal could use a mean square error detection scheme.

The data in QAM signaling is represented by a constellation of points at specific coordinates on a plane formed by the I axis 102 and Q axis 104. The expected locations of the points in the constellation are marked by X's 106, 108, 110, 112 in figure 100 are known. The actual location of the points 114, 116, 118, 120, representing data often are offset from their expected locations due to interference as shown by point 114 and point 118. This offset is an error and the amount of error is calculated by use of a Mean Square Error formula. The Formula is:

$$\text{MSE} = 1/k \Sigma (\text{distance}(d_i, r_i))^2$$

Where:

$d_i$=desired digital value $r_i$=received digital value $k_i$=number of sample points An example would be if the first received point 114 had coordinates (0.83, 0.64) and the second received point had coordinates (−0.91, −0.78) and the nearest desired point 106 for the first received point 114 was (0.707, 0.707) and the nearest desired point for the second received point was (−0.707, −0.707), the MSE is 0.033. The metric that is generated by the MSE is a value representing the distance offset of the received signal from the expected signal. The greater the MSE value, the greater the error that has been detected in the received data.

Figure 6:
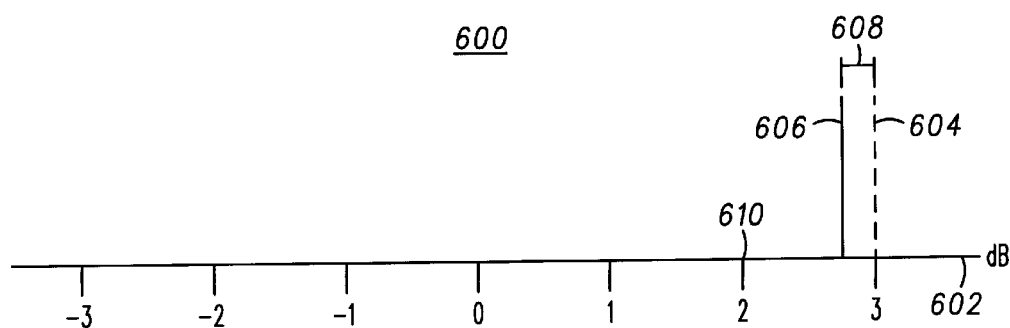
FIG. 6 is a diagram of an Accumulated Slicer-Error error detection in accordance with the preferred embodiment of the invention.

FIG. 6 is a graphical depiction of an Accumulated Slicer-Error in accordance with the preferred embodiment of the invention. The Accumulated Slicer-Error is shown with a Frequency-Shift Keying (FSK) modulated signal but can be used with other single modulated signaling methods. Data sent by shifting the frequency of a carrier. The receiving device knows the expected location or quantiztion level of the received carrier 604 within the radio frequency spectrum 602. The actual received carrier 606 may be offset from the expected carrier 604. The Accumulated Slicer-Error value is simply the distance 608 between the expected 604 and actual received carriers 606. The distance 608 measured between the received digital value (evaluated at a specific time) to the nearest acceptable quantization level 604. The slicer quantizes a received digital value to the nearest value that should have been received assuming the channel was perfectly noiseless and distortionless. The formula for Slicer-Error is:

$$\text{Slicer-Error} = \text{distance}(d, r)$$

Where:
   d=desired digital value
   r=received digital value An example is if a received value was 2.8 MHz and the lower quantiztion level is 2.0 MHz 610 and the upper quantization level is 3.0 MHz 604, the Slicer-Error is 0.2 MHz (the received value would be sliced or quantized to the nearest value of 3.0 MHz 604).

Figure 7:
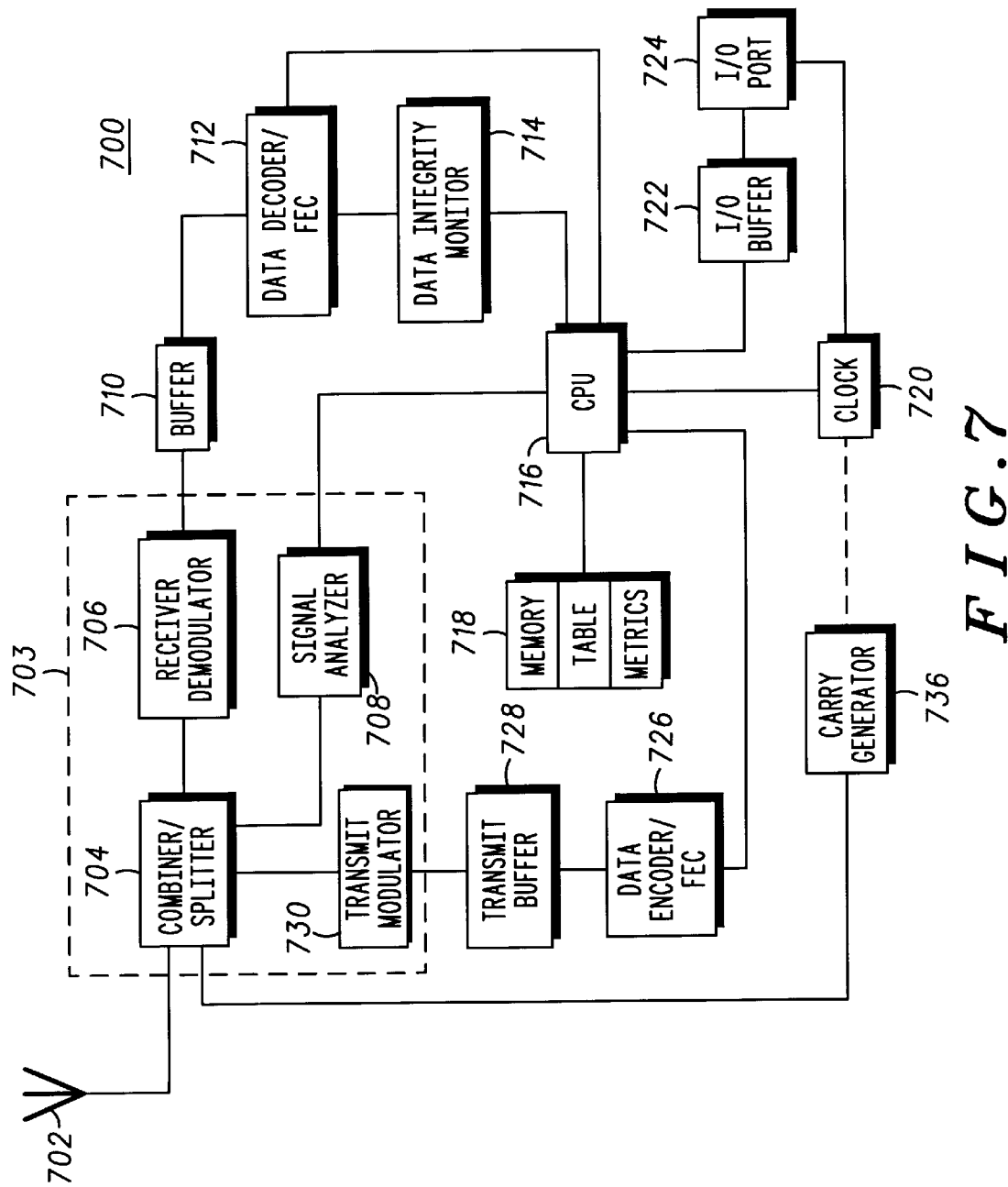
FIG. 7 is a block diagram of a Transceiver in accordance with the preferred embodiment of the invention.

FIG. 7 is a block diagram of a transceiver device in accordance with the preferred embodiment of the invention. The transceiver device 700 has an Antenna 702 for receiving and transmitting RF signals. The antenna 702 is connected to the transceiver 703 having a combiner/splitter 704 that combines an outgoing signal with a carrier or splits a received from a carrier signal. The combiner/splitter 704 is connected with a transmitter modulator 730, a receiver demodulator 706, and a signal analyzer 708. The receiver demodulator 706 demodulates the signal if the implementation requires it. The data from the demodulated signal is stored in a buffer 710. The Data Decoder 712 then decodes the data from the buffer 710. This is where the packetizing information and CRC information is extracted. In addition, if the receiver has a FEC decoder, such as a Viterbi encoder, the data decoder 712 contain a Viterbi decoder and generate FEC metrics. The data analyzer or data integrity monitor 714 checks the data for errors and generates ARQ metrics. Some types of error metrics that are conducted are CRC and checksums. The microprocessor or CPU 716 is a data processor that processes the received data from the data decoder 712 and takes appropriate error correction actions, such as sending a retransmission request to a transmitting device. The signal analyzer 708 is connected to the combiner/splitter 708 and CPU 716. The signal analyzer 708 is where the calculation of the Mean Square Error, Accumulated Slicer-Error, and signal-to-noise metrics are calculated and the resulting error metrics are transferred to the CPU 716.

When the CPU 716 receives the error metrics from the signal analyzer 708 and Data Analyzer 714, the metric values are normalized. Normalization by the CPU 716 is accomplished by taking an average of the metric values over a fixed number of messages or fixed intervals of time. The normalized error metric values are then equalized and combined into a resultant sum by the CPU 716 and stored in a metric portion 732 of the memory 718.

The memory 718 also contains a lookup table in the table Memory 734. The table is referenced with the resultant sum and yields a forward error correction transmission parameters and automatic retry query value. The forward error correction value and automatic retry query values are sent to the data encoder 726 and the data decoder 712 and transmitted by the antenna 702 to other devices.

The data that is received by the transceiver device 700 is sent to an input/output buffer 722 that is connected to an input/output port 724. The transceiver device 700 can also transmit data by inputting the data to the input/output port 724 and having the input/output buffer 722 for holding the data for processing by the CPU 716.

The CPU 716 then transfers the data to the data encoder 726 that contains a FEC encoder, such as a Viterbi encoder. The CPU 716 can also configure the data encoder 726 with the amount of FEC required. The data from the data encoder 726 is buffered in a transmit buffer 728. The transmit data in the transmit Buffer 728 is then modulated into a RF signal by the transmitter modulator 730. The RF data signal is then combined by the combiner/splitter 704 with a carrier from the carrier generator 736 and transmitted by the antenna 702.

A clock 720 is used for timing by the transceiver device 700. The clock 720 can control the timing for the input/output port 724, CPU 716, and the carrier 736 if needed. The clock signal is not limited only to the elements shown. If other devices require a clock signal, such as a CRC checker, the clock 720 can also supply a clock signal to these other devices.

Figure 8:
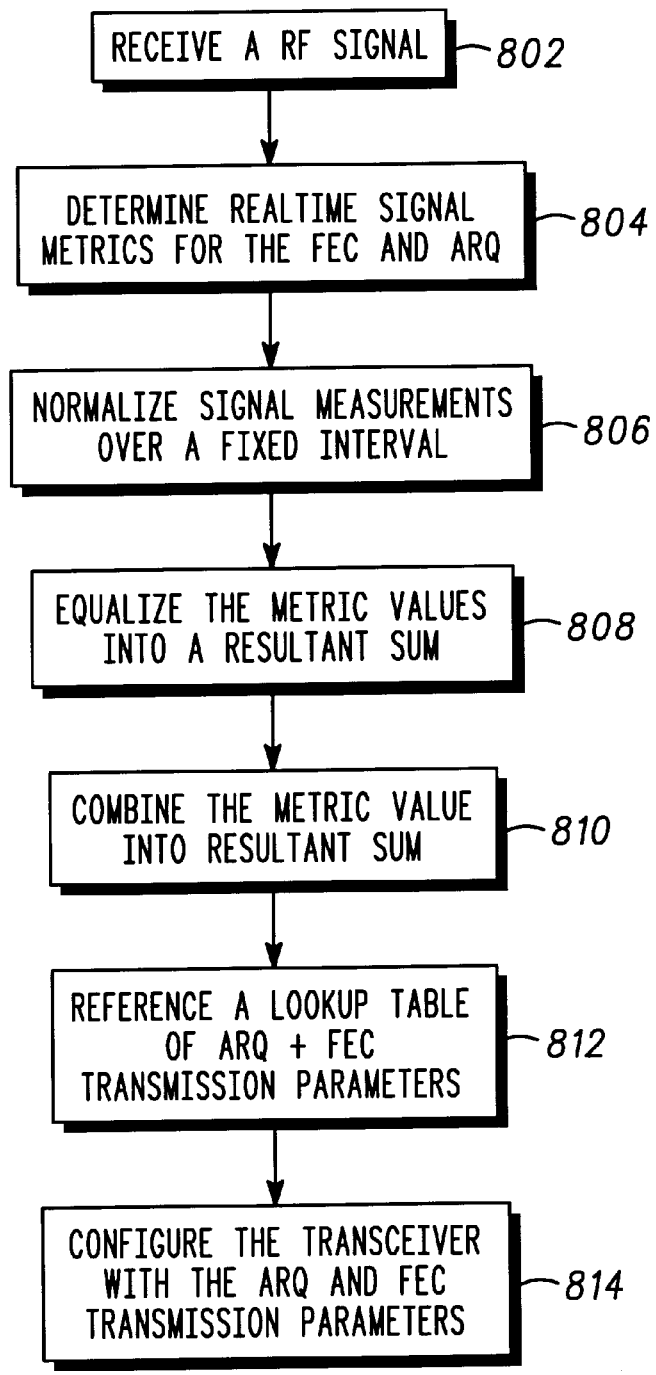
FIG. 8 is a flow chart of a method for dynamically changing the Forward Error Correction and Automatic retry query in accordance with the preferred embodiment of the invention.

FIG. 8 is a flow chart of a method for dynamically changing the forward error correction (FEC) and automatic retry query (ARQ) in accordance with the preferred embodiment of the invention.

The first step 802 is to receive a RF signal containing data. The quality of the signal is then analyzed to determine real time signal metrics for FEC and ARQ. Some methods for determining these types of errors are commonly called Accumulated Slicer-Errors or Mean Square Error and will result in a numerical representation of signal errors. Other methods of error detection involve Viterbi Path Metrics, CRC counts, and checksum counts. The metrics are normalized over a fixed interval 806. This I, preferably implemented as simply taking an average for each metric over a fixed interval of time or for a fixed number of messages, blocks or frames. Another method of normalizing would be to apply each metric to a unitary mapping function creating a normalized output.

The next step is to equalize the metric values 808 to a common range and combine the metric values into a resultant sum 810. The individual equalized metric values are summed and an average is taken yielding a resultant sum.

The resultant sum is used to reference a lookup table of ARQ and FEC transmission parameter 812. The ARQ value directs the transceiver as to the size of packet or data that is automatically retransmitted when queried. The FEC transmission parameter minimally sets the constellation density and the coding rate. The invention is not limited to only one possibility for the FEC transmission parameter and ARQ value derived from one resultant sum.

The final step is to configure the transceiver device with the ARQ and FEC transmission parameter 814. The changing of the ARQ and FEC transmission parameter is communicated to the FEC encoder/decoder and the data encoder/decoder so received and transmitted data will be decodable by both the transmitting and receiving device.

By implementing the invention described above a more efficient use of bandwidth results. In previous systems where fixed ARQ and FEC transmission parameter are implemented bandwidth is either wasted because the signal is not degraded by interference or so much interference is present that error correction and retransmission is inefficient. The dynamic reconfiguration of the transceiver device allows a more efficient use of the bandwidth.

A preferred embodiment has only been described in the above description by way of example with reference to the diagrams.

We claim:
1. A method of dynamic forward error correction and automatic retry query comprising;
   receiving a RF signal at a transceiver;
   determining from the RF signal a set of real time signal measurements, wherein the real time signal measurements are taken from the group consisting of a Viterbi path metric, a packet erasures counter, a number of automatic retry queries, a received constellation quality and a slicer error metric;
   normalizing and combining the set of real time signal measurements resulting in a resultant sum;
   referencing a lookup table with an index value derived from the resultant sum in order to determine a forward error correction transmission parameter and an automatic retry query value; and configuring the transceiver with the forward error correction transmission parameter and automatic retry query value based on the resultant sum.

2. A method according to claim 1, wherein the resultant sum is an average over a fixed interval.

3. A method according to claim 2, further comprising deriving a reference number from entering the average over a fix interval into a unitary mapping function.

4. An apparatus having a transceiver comprising;

a forward error correction decoder having an output providing at least one forward error correction metric, wherein the forward error correction metric is taken from the group consisting of a Viterbi path metric, a packet erasures counter, a number of automatic retry queries, a received constellation quality and a slicer error metric;

a data integrity monitor having an output providing at least one automatic retry query metric;

a data processor responsive to the forward error correction metric and the automatic retry query metric and having an output providing a forward error correction transmission parameter and an automatic retry query value; and the transceiver being responsive to the forward error correction transmission parameter and the automatic retry query value.

5. An apparatus according to claim 4, wherein the data processor contains a lookup table which correlates the forward error correction metric and the automatic retry query metric with the output of the corresponding forward error correction transmission parameter and the automatic retry query value.

* * * * *